Nov. 7, 1967  F. L. ROSE  3,350,996
ADJUSTABLE FIRE LOUVRE
Filed Jan. 17, 1966  2 Sheets-Sheet 1
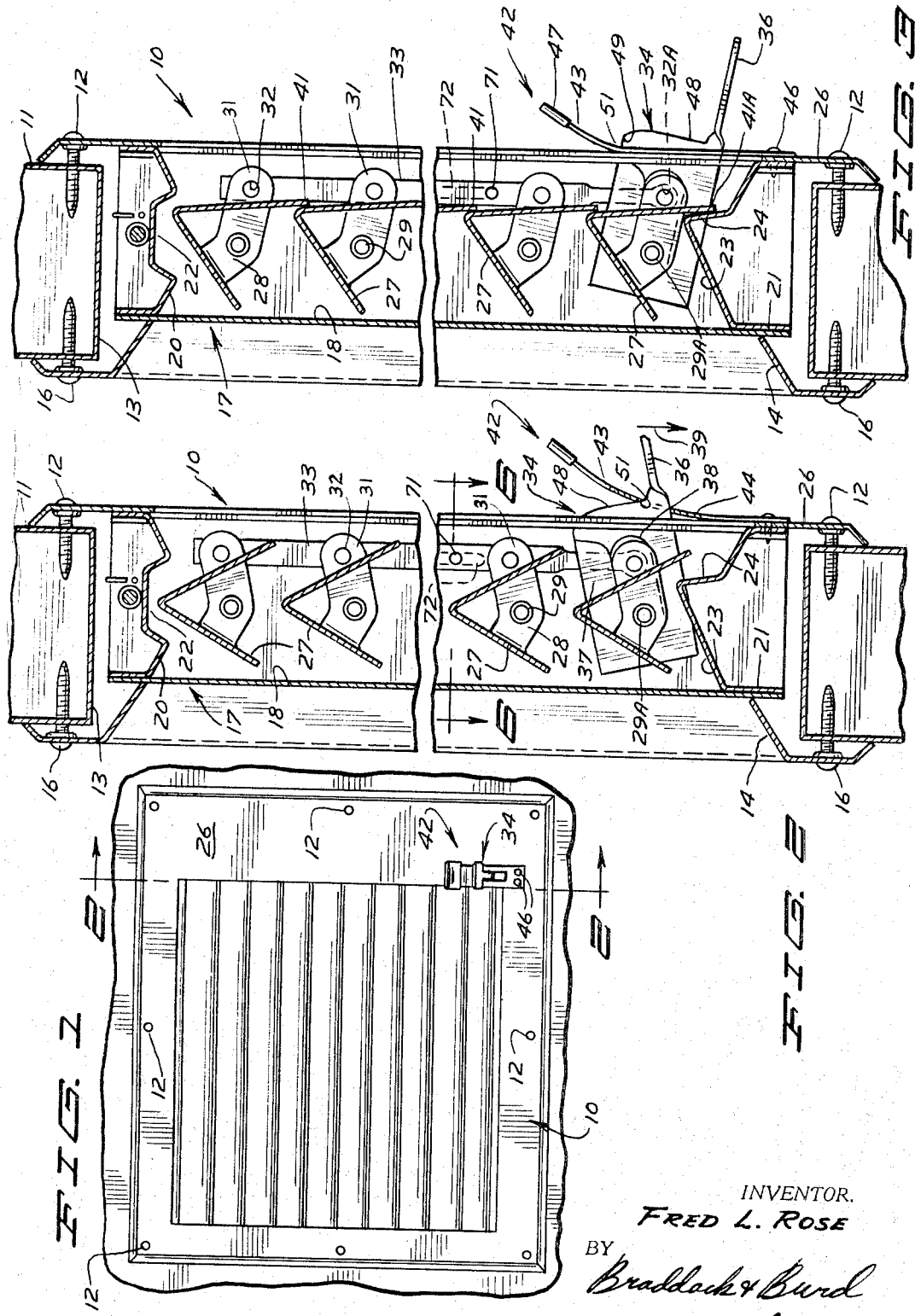
INVENTOR.
FRED L. ROSE
BY
Braddock & Burd
ATTORNEYS Nov. 7, 1967

F. L. ROSE 3,350,996

Figures 4, 5, 6:
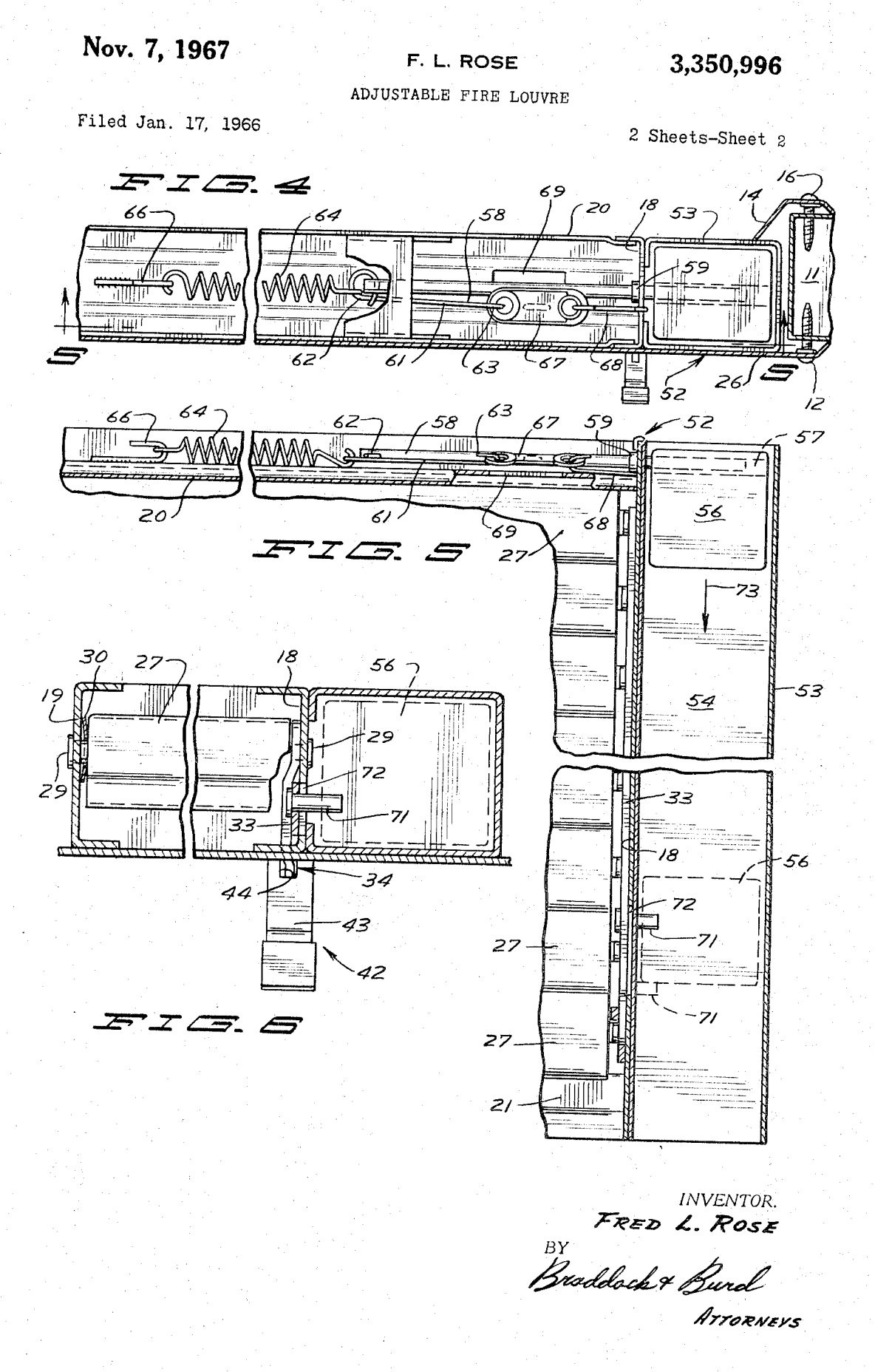

ADJUSTABLE FIRE LOUVRE

Filed Jan. 17, 1966

INVENTOR.
FRED L. ROSE
BY
Braddock & Burd
ATTORNEYS

United States Patent Office 3,350,996
Patented Nov. 7, 1967

3,350,996
ADJUSTABLE FIRE LOUVRE
Fred L. Rose, Williamstown, W. Va., assignor to The Airolite Company, Marietta, Ohio, a corporation of Ohio
Filed Jan. 17, 1966, Ser. No. 520,992
6 Claims. (Cl. 98—86)

ABSTRACT OF THE DISCLOSURE

The blades of a louvre are movable between open and closed positions by means of a common control member. A weight is supported in an upper portion of the louvre frame by a weight support pin which is slidably mounted with respect to that frame. A spring biases this pin to move it through the frame clear of the weight to drop the weight on a control arm pin which extends outwardly from the control arm. This causes downward movement of the control arm to close the louvres. The spring biasing means is prevented from moving the support pin by a heat fusible link which is situated in the louvre frame to intercept some of the air passing through the louvre blades. A manually releasable lock holds the control arm and louvres in closed condition.

---

This invention relates to a ventilator panel used to control movement of air. More particularly the panel of this invention is a louvre having adjustable blades capable of being manually moved to open positions and to closed positions as well as automatically moved from the open positions to the closed positions when the temperature of the air moving through the louvre abnormally increases.

The louvre of this invention is an improvement of the ventilator disclosed in Patent 2,494,835.

The present louvre has a plurality of louvre blades which can be moved to open and closed positions to regulate the flow of air through the louvre. All of the blades are moved in unison with a control member which can be either manually actuated or automatically actuated to close the louvre. A trigger coupled to the control member is used to manually adjust the open positions of the blade members. This trigger coacts with a releasable lock to hold the louvre blades closed. The lock must be released before the louvre blades can be moved to their open positions.

With an abnormal increase in temperature, as is the case of a fire, the louvre blades are automatically closed by a weight acting on the control member. The weight is normally held in an inoperative position by a release pin restrained with a fusible link. A biasing means acts on the release pin to move the pin out of engagement with the weight when the fusible link is destroyed by hot air moving through the louvre. Under these circumstances the weight falls by gravity striking a portion of the control member thereby moving the control member to a position closing the louvre blades. The releasable lock holds the louvre blades in their closed positions. The blades cannot be opened until the lock is released.

In the drawings:

FIGURE 1 is an interior elevational view of the louvre of this invention in assembled relation with a wall;

FIGURE 2 is an enlarged sectional view taken along the line 2—2 of FIGURE 1 showing the open positions of the louvre members;

FIGURE 3 is a view similar to FIGURE 2 showing the closed positions of the louvre members;

FIGURE 4 is a fragmentary top view of the louvre of FIGURE 1;

FIGURE 5 is a fragmentary sectional view taken along the line 5—5 of FIGURE 4; and FIGURE 6 is a sectional view taken along the line 6—6 of FIGURE 2.

Referring to the drawings there is shown in FIGURE 1 the louvre of this invention indicated generally at 10 mounted on an upright wall 11. Fasteners 12, as oval head screws, are used to secure the louvre to the wall. As shown in FIGURES 2 and 3, louvre 10 is located in an opening 13 in the upright wall 11. A rectangular moulding 14 secured to the outside of wall 11 by fasteners 16, as screws or nails, projects into the opening and engages the louvre so as to firmly mount and position the louvre on the wall.

Louvre 10 has a rectangular shaped frame indicated generally at 17 comprising upright channel sides 18 and 19 secured to a top channel member 20 and a bottom channel member 21. Top channel member 20 has an upwardly directed groove 22 extended along the length thereof. Bottom channel member 21 projects upwardly and has an outwardly and downwardly directed wall 23 joined with an inside upright wall 24. A rectangular moulding plate 26 having an opening is secured by the spot welds or the like to the inside flanges of the channel members of the frame. The outer perimeter of plate 26 is turned toward the wall 11 to provide a smooth appearance.

A plurality of louvre blades 27 extend transversely across the opening of the frame between opposite channel sides 18 and 19. As shown in FIGURE 2, louvre blades 27 are inverted V-shaped members located in a side-by-side relation in a common upright plane. Inwardly directed arms 28 are secured to each end of each blade 27. The blade and arms are preferably formed from a single blank of sheet metal. Arms 28 are located adjacent the channel sides 18 and 19 and are pivotally connected to the sides by pivot members 29, such as brass rivets or the like. As shown in FIGURE 6, an upright transversely curved strip spring 30 positioned between one end of the blades 27 and channel side 19 biases the blades toward channel side 18.

Each louvre blade 27 pivots about a generally horizontal transverse axis and angularly moves about 30° between an open position as shown in FIGURE 2 and a closed position as shown in FIGURE 3. The louvre blades 27 are moved in unison so that the entire louvre is either opened or closed. Each arm 28 adjacent channel side 18 has an inwardly directed projection 31 having a laterally projected circular flange 32. The flanges 32 of the arms project through spaced holes in an upright control member or bar 33 positioned between the projections 31 and the adjacent wall of the channel side 18. Bar 33 moves in an upward direction to open louvre blades 27 and is moved in a downward direction to close the louvre blades.

The lower end of the bar 33 is coupled to a trigger indicated generally at 34 and manually movable to raise and lower the bar. Trigger 34 is a generally flat member having an inwardly projected finger grip 36 located inwardly of mounting plate 26. The flat upright portion of trigger 34 projects through a suitable slot in plate 26 and is pivotally mounted on the pivot member 29a which also pivotally mounts the lower louvre blade 27 to the channel side 18. The top side 37 of trigger 34 is offset and bears against the top of the adjacent projection 31 so that on downward movement of trigger 34 bar 33 will be carried downwardly to the closed position as shown in FIGURE 3. Flange 32a projects through an opening 38 in the mid-section of trigger 34 and into a hole in the lower end of bar 33 whereby upward movement of trigger 34 forces the bar 33 in an upright direction. When finger grip 36 is moved in a downward direction as indicated by arrow 39 in FIGURE 2 bar 33 is moved downwardly pivoting all the louvre blades 27 about the pivot members 29 to closed positions as shown in FIGURE 3.

When the louvre is closed the lower lips 41 of the louvre blades engage the apex sections of the adjacent louvre blades. The lower lip 41a of the bottom louvre blade engages the inside upward wall 24 of bottom channel member 21 thereby closing the opening in the frame 17.

A positive lock indicated generally at 42 coacts with the trigger 34 to hold the trigger along with the louvre blades 27 in their closed positions. As shown in FIGURES 2, 3 and 6, lock 42 comprises a leaf spring 43 having a rectangular opening 44 of a size to receive the flat portion of trigger 34 which projects through moulding plate 26. Screws 46 attach the lower end of spring 43 to moulding plate 26. The upper end of spring 43 is bent outwardly and carries a rubber finger pad 47. Spring 43 is made from flat resilient material, as stainless steel, and has an initial bow so that when screws 46 attach the spring to the plate 26 the spring will normally be biased into flat engagement with the moulding plate 26. The trigger 34 has a convex curved inward end 48 joined to a straight top side 49. The top edge 51 of spring 43 engages the inward end 48 of the trigger when the louvre blades are opened as shown in FIGURE 2. When the louvre blades 27 are closed edge 51 engages top side 41 of the trigger holding the trigger in a down or closed position. Before the trigger 34 can be moved upwardly about the pivot member 29a the lock 42 must be released. This is accomplished by applying an outward force to the spring 43 moving the holding edge 51 from adjacent top side 49 of trigger 34. The trigger 34 can now be rotated in an upward direction to open louvre blades 27. On movement of the trigger 34 in a downward direction the lock 42 will automatically position itself in the lock or hold position as shown in FIGURE 3 because the leaf spring 43 is biased flat against the moulding plate 26.

When the temperature of the air moving past the louvre blades 27 increases abnormally, as the case of fire, an automatic closing mechanism indicated generally at 52 will force the control bar 33 in a downward direction closing all the louvre blades 27. Automatically closing mechanism 52 comprises a generally upright U-shaped housing 53 secured to the side of channel side 18 as shown in FIGURES 4, 5 and 6. Housing 53 together with the side 33 form an upright passage 54 which serves as a guide for a weight 56, such as a cast block. Weight 56 has a transverse bore 57 accommodating an end of a release pin 58. Release pin 58 projects through a collar 59 integral with the top of channel side 18 into bore 57 to hold weight 56 in an elevated position. The opposite end of pin 58 is secured to a hook 61 through a hook eye 62 attached to a spring 64. The opposite end of spring 64 is secured to a curved finger 66 attached to the top of channel member 20. When pin 58 projects into bore 57 of the weight spring 64 is under tension urging the pin 58 out of or away from weight 56.

Spring 64 is held in an expanded position and pin 58 is held in engagement with weight 56 through a fusible link 67 connected to the reverse turned end 63 of hook 61 and a hook 68 connected to the channel side 18. Fusible link 67 is an elongated member having transverse holes through opposite ends thereof for the hooks 61 and 68, respectively. Fusible link 67 is made from material which melts at about 135° F. As shown in FIGURES 4 and 5, fusible link 67 is located immediately above an opening 69 in channel member 20 so that a portion of the air moving over the top of upper louvre blade 27 will move across or past link 67. This exposes fusible link 67 to the temperature of the air moving through the louvre.

Automatic closing mechanism 52 operates to move all the louvre blades 27 to closed positions when the air moving through the louvre is sufficiently heated to destroy the fusible link 67. As shown in FIGURE 5, fusible link 67 is exposed to the air moving through the louvre by reason of the opening 69. On an increase of temperature above 135° fusible link 67 will be destroyed and break as it is placed under tension of spring 64. When fusible link 67 is broken spring 64 moves release pin 58 out of the bore 57 in the weight 56 so that the weight under the influence of gravity will fall in the upright passage 54 defined by housing 53. The falling weight 56 strikes pin 71 moving it in a downward direction as shown in broken lines in FIGURE 5. Pin 71 secured to control bar 33 carries the bar in a downward direction closing all louvre blades 27 and pivoting trigger 34 downwardly whereby the lock 42 automatically holds the trigger in the closed position as shown in FIGURE 3. The louvre blades 27 can only be opened by manually releasing lock 42 and moving trigger 34 in an upward direction to the open position as shown in FIGURE 2. Thus, lock 42 prevents the accidental opening of the louvre blades 27 by unequal air pressure on opposite sides of the louvre when such conditions prevail as in the case of a fire.

The louvre 10 can be readily restored to an operative condition by removing the louvre from wall 11 and assembling pin 58 with weight 56. Pin 58 is held in position by using a new fusible link 67 as shown in FIGURE 5.

The invention is defined in the following claims.

I claim:

1. In a louvre having a frame, a plurality of louvre blades pivotally mounted on the frame for movement to open positions and to closed positions to control movement of air through the louvre, and a control member connected to each louvre blade for simultaneously controlling the open and closed positions of the louvre blades, the improvement of: pin means secured to and projected from the control member, a weight normally spaced above the pin means, release means constituted as a pin movably mounted on the frame between a first weight supporting position where it holds the weight spaced above the pin means and a second position clear of said weight, means biasing the release means toward said second position to be out of engagement with said weight and means including a fusible means for holding the release means in said first position in engagement with the weight thereby holding the weight spaced above the pin means, said biasing means on destruction of said fusible means disengages the release means from the weight whereupon the weight falls by gravity striking the pin means moving the control member which in turn moves the louvre blades to their closed positions.

2. The louvre structure defined in claim 1 wherein said fusible means is located generally in alignment with an opening in the frame in position to expose the fusible means to the air moving through the louvre.

3. In a louvre having a frame, a plurality of louvre blades pivotally mounted on the frame for movement to open positions and to closed positions to control movement of air through the louvre, and a control member connected to each louvre blade for simultaneously controlling the open and closed positions of the louvre blades, the improvement of: pin means secured to and projecting from the control member, a weight normally spaced above the pin means, release means movably mounted on the frame and engageable with the weight to hold the weight spaced above the pin means, means constituted as a spring attached to the frame and to the release means for biasing the release means out of engagement with the weight, and means including a fusible means for holding the release means into engagement with the weight thereby holding the weight spaced above the pin means, said biasing means on destruction of said fusible means disengages the release means from the weight whereupon the weight falls by gravity striking pin means moving the control member which in turn moves the louvre blades to their closed positions.

4. In a louvre having a frame, a plurality of louvre blades pivotally mounted on the frame for movement to open positions and to closed positions to control movement of air through the louvre, and a control member connected to each louvre blade for simultaneously controlling the open and closed positions of the louvre blades, the improvement of: a trigger pivotally mounted on the frame and connected to the control member for moving the control member in response to movement of the trigger to a first position and a second position to open and close the louvre blades, releasable lock means mounted on the frame coacting with the trigger to hold the control member in the first position whereby the louvre blades are locked in their closed positions, a pin secured to and projected from the control member, a weight, and means including a fusible link for holding the weight spaced above the pin, said weight adapted to fall by gravity on destruction of the fusible link and strike the pin moving the control member from the first position to the second position thereby moving the louvre blades to their closed positions.

5. The louvre structure defined in claim 4 wherein said means for holding the weight further includes release means movably mounted on the frame and engageable with the weight to hold the weight spaced above the pin, means biasing the release means away from the weight and link means connected to the release means, the fusible link and the frame for holding the release means in engagement with the weight as long as the fusible link remains in one piece, said biasing means on destruction of said fusible link disengages the release means from the weight whereupon the weight falls by gravity striking the pin moving the control member which in turn moves the louvre blades to their closed positions.

6. The louvre structure defined in claim 5 wherein said release means is a pin slidably mounted on the frame.

References Cited

UNITED STATES PATENTS

| | | | |
|---|---|---|---|
| 1,788,556 | 1/1931 | Wood et al. | 98—86 |
| 1,871,161 | 8/1932 | Dickson | 49—7 |
| 2,494,835 | 1/1950 | Rose | 98—110 |
| 2,954,728 | 10/1960 | Smith | 98—86 X |
| 2,600,934 | 6/1952 | Spieth | 98—110 |

ROBERT A. O'LEARY, *Primary Examiner.*

M. A. ANTONAKAS, *Assistant Examiner.*